(12) United States Patent
Abusleme et al.

(10) Patent No.: US 6,417,390 B1
(45) Date of Patent: *Jul. 9, 2002

(54) POLYMERIZATION PROCESS IN SUSPENSION

(75) Inventors: Julio A. Abusleme, Saronno; Paolo Lazzari, Mandello Lario, both of (IT)

(73) Assignee: Ausimont S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,778

(22) Filed: Nov. 8, 1999

Related U.S. Application Data

(62) Division of application No. 08/888,690, filed on Jul. 7, 1997, now Pat. No. 6,013,747.

(30) Foreign Application Priority Data

Jul. 9, 1996 (IT) .......................... MI96A1411

(51) Int. Cl.[7] .............................. C07C 69/66
(52) U.S. Cl. ....................... 560/184; 564/191
(58) Field of Search ............... 560/184; 564/191

(56) References Cited

U.S. PATENT DOCUMENTS

| | | |
|---|---|---|
| 3,242,218 A | 3/1966 | Miller |
| 3,624,250 A | 11/1971 | Carlson |
| 3,644,492 A | 2/1972 | Bartlett |
| 3,665,041 A | 5/1972 | Sianesi et al. |
| 3,715,378 A | 2/1973 | Sianesi et al. |
| 3,865,845 A | 2/1975 | Resnick |
| 3,978,030 A | 8/1976 | Resnick |
| 4,482,685 A | 11/1984 | Chin et al. |
| 4,513,129 A | 4/1985 | Nakagawa |
| 4,523,039 A | 6/1985 | Lagow et al. |
| 4,524,194 A | 6/1985 | Dumoulin |
| 4,529,781 A | 7/1985 | Cavanaugh |
| 4,739,024 A | 4/1988 | Moggi et al. |
| 4,918,151 A | 4/1990 | Sharaby |
| 5,021,516 A | 6/1991 | Wheland |
| 5,087,679 A | 2/1992 | Inukai et al. |
| 5,144,092 A | 9/1992 | Marraccini |
| 5,182,342 A | 1/1993 | Feiring et al. |
| 5,376,441 A | 12/1994 | Wu et al. |
| 5,434,229 A | 7/1995 | Abusleme et al. |
| 5,763,552 A | 6/1998 | Feiring et al. |

FOREIGN PATENT DOCUMENTS

| | | |
|---|---|---|
| EP | A 073087 | 3/1983 |
| EP | A 976581 | 4/1983 |
| EP | A 080187 | 6/1983 |
| EP | A 148482 | 7/1985 |
| EP | A 185242 | 6/1986 |
| EP | A 186215 | 7/1986 |
| EP | 0 695 766 A1 | 2/1991 |
| EP | A 526216 | 2/1993 |
| EP | 0 539 943 A2 | 4/1993 |
| EP | 0 548 745 A2 | 6/1993 |
| EP | A 673951 | 9/1995 |
| EP | A 673952 | 9/1995 |
| EP | 0 712 882 A1 | 5/1996 |
| EP | 0 812 890 A2 | 12/1997 |
| GB | 1 032244 | 6/1966 |
| GB | 1 104482 | 2/1968 |

OTHER PUBLICATIONS

Encyclopedia of Polymer Science and Engineering, p. 534, vol. 17, 1985, II ed.
Encyclopedia of Polymer Science and Engineering, p. 444, vol. 16, 1985, II ed.

*Primary Examiner*—Bernard Lipman
(74) *Attorney, Agent, or Firm*—Arent Fox Kintner Plotkin & Kahn

(57) ABSTRACT

Use of surfactants in the suspension polymerization of fluorinated monomers for preparing fluoropolymers containing hydrogen, said surfactants having the general formula:

$$R_f\text{—}[L\text{—}(OCHR_1\text{—}CHR_2)_m\text{—}OZ]_i$$

wherein:
  i is equal to 1 or 2;
  m is an integer comprised between 4 and 60;
  L can be chosen between: —(CFY—CO—O)$_p$R'— and —(CFY—CO—NH)$_p$R'—
  wherein is an integer equal to 0 or to 1;
  Y=F, CF$_3$; R'=alkylic radical C$_1$–C$_5$, linear or branched when possible;
  R$_1$, R$_2$ can be both H or the former H and the latter CH$_3$;
  Z can be H, alkyl radical C$_1$–C$_3$, linear or branched when possible; or (CH$_2$)$_n$OH with n an integer from 1 to 6;
  R$_f$ is a perfluoroalkylic radical or a perfluoropolyether radical, having a number average molecular weight comprised between 250 and 1500.

4 Claims, No Drawings

POLYMERIZATION PROCESS IN SUSPENSION

This application is a division of U.S. appl. Ser. No. 08/888,690, filed Jul. 7, 1997, now U.S. Pat. No. 6,013,747.

The present invention relates to a (co)polymerization process in suspension for preparing thermoplastic fluoropolymers containing hydrogen.

Various kinds of fluorinated polymers containing hydrogen having thermoplastic properties are known in the art. A first class is formed by copolymers of per(halo)fluoroolefins with non halogenated olefins, such as for instance tetrafluoroethylene (TFE) or chlorotrifluoroethylene (CTFE) copolymers with ethylene, optionally containing a third fluorinated comonomer in amounts comprised between 0.1 and 10% by moles (see for instance U.S. Pat. No. 3,624,250). The preparation of such copolymers is generally carried out in suspension and, especially in the case of CTFE/ethylene copolymers, is preferably carried out at low temperature.

Another class of thermoplastic fluoropolymers containing hydrogen is formed by polyvinylidenfluoride (PVDF) and by modified PVDF with small amounts (0.1–10% by moles) of other fluorinated comonomers.

The use of suspending and/or wetting agents (both indicated herein generically as wetting agents) is known in the suspension polymerization, especially in the VDF copolymerization. See for instance Encyclopedia of Polymer Science and Engineering, p. 534, vol. 17, 1985, II Edition.

Polyvinylic alcohols, alkyl-alkylhydroxyalkyl-cellulose, for instance methylcellulose, hydroxypropylcellulose are for instance utilized. See U.S. Pat. Nos. 4,524,194 and 5,087,679. The drawback of the wetting agents utilized in the art resides in that they remain in the polymer particles and give rise during the polymer processing to discoloration phenomena and/or starting of decay. See Vol. 16, pag. 444 of the Encyclopedia mentioned above.

On the other hand, wetting agents are used in general to reduce the polymer buildup in the reactor.

The utilization of wetting agents allows the polymerization in organic suspension in totally or partially metal reactors. In these cases in absence of wetting agents it is very difficult to control the polymerization owing to the formation of buildup in the autoclave.

The use of alcohols as wetting agents, for instance methanol and terbutanol, is known in the art. However tests carried out by the Applicant have shown that these can decrease the polymerization yield, (see the examples). Moreover, the alcohols, in the case of recovery of the unreacted monomers in the industrial plants, can interact with these by forming azeotropes, thus making it difficult the monomer recovery.

In addition it was felt the need to have available polymerization processes allowing to limit the amount of fines (fine polymer powder) to very low extent for better handling and buildup in the reactor. Further the polymer so produced must not discolour and/or degrade during the successive processing steps at high temperatures for sufficiently long times and even longer than those of the art.

The Applicant has surprisingly and unexpectedly found that the above technical problem has found the solution by utilizing a specific family of non-ionic surfactants, defined hereinafter, which allows to reduce to a minimum the amount of fines and buildup in the polymerization of fluorinated polymers containing hydrogen, as defined above, without giving rise to discoloration processes and/or starting degradation in the extruded product at high temperature. Moreover, the use of a non-ionic surfactant allows, if desired, to recover it from the polymerization phase on the basis of the cloud point of the surfactant.

An object of the present invention is therefore the use of surfactants in the suspension polymerization of fluorinated monomers for preparing fluoropolymers containing hydrogen, said surfactants having the general formula:

$$R_f\text{—}[L\text{—}(OCHR_1\text{—}CHR_2)_m\text{—}OZ)]_i$$

wherein:

i is equal to 1 or 2, preferably 1;

m is an integer comprised between 4 and 60 preferably between 8 and 30

L can be selected from: $-(CFY\text{—}CO\text{—}O)_pR'-$ and $-(CFY\text{—}CO\text{—}NH)_pR'-$ wherein p is an integer equal to 0 or to 1;

Y=F, $CF_3$; R'=alkyl radical $C_1$–$C_5$, linear or branched when possible;

$R_1$, $R_2$ can be both H or the former H and the latter $CH_3$; both preferably H.

Z can be H, alkyl radical $C_1$–$C_3$, linear or branched when possible, or $(CH_2)_nOH$ with n an integer from 1 to 6;

$R_f$ is a perfluoroalkyl radical or a perfluoropolyether radical, having a number average molecular weight comprised between 250 and 1500, preferably between 400 and 1000. When The $R_f$ radical is of perlfuoropolyether type, comprises repeating units statistically distributed along the polymer chain selected from:

$(CF_2CF_2O)$, $(CFXO)$ wherein X is equal to F or $CF_3$, $(C_3F_6O)$, $(CF_2(CF_2)_zO)$ wherein z is an integer equal to 2 or 3, $(CF_2CF(OR_f)O)$, $(CF(OR_f)O)$ wherein $R_f$ is equal to $-CF_3$, $-C_2F_5$, $-C_3F_7$.

When the $R_f$ radical is monovalent, the terminal (T) of the perfluoropolyethereal radical is chosen from $-CF_3$, $-C_2F_5$, $-C_3F_7$, $ClCF_2CF(CF_3)-$, $CF_3CFClCF_2-$, $ClCF_2CF_2-$, $ClCF_2-$.

The following perfluoropolyether $R_f$ can in particular be mentioned as preferred:

$$T\text{—}O(CF_2CF(CF_3)O)_a(CFXO)_b-\quad\quad (a)$$

wherein

X is F or $CF_3$; a and b are such integers that the molecular weight is comprised in the range indicated above; a/b is comprised between 10 and 100;

or the repeating units indicated in (a) can be linked as follows to give a bivalent $R_f$:

$$-O(CF_2CF(CF_3))_a(CFXO)_b\text{—}O\text{—}CF_2(R'_f)_xCF_2\text{—}O\text{—}(CF_2CF(CF_3)O)_a(CFXO)_b-$$

wherein $R'_f$ is a fluoroalkylenic group, for instance from 1 to 4 carbon atoms;

$$T\text{—}O(CF_2CF_2O)_c(CF_2O)_d(CF_2(CF_2)_zCF_2O)_h-\quad\quad (b)$$

wherein c, d and h are such numbers that the molecular weight is comprised in the range indicated above; c/d is comprised between 0.1 and 10; h/(c+d) is comprised between 0 and 0.05, z has the value indicated above, $$-O(CF_2CF_2O)_c(CF_2O)_d(CF_2(CF_2)_zCF_2O)_h-\quad\quad (b')$$

wherein c, d and h are such numbers that the molecular weight is comprised in the range indicated above; c/d is comprised between 0.1 and 10; h/(c+d) is comprised between 0 and 0.05, z has the value indicated above, $$T\text{—}O(CF_2CF(CF_3)O)_e(CF_2CF_2O)_f(CFXO)_g-\quad\quad (c)$$

wherein
X is F or $CF_3$; e, f, g are numbers such that the molecular weight is comprised in the range indicated above; e/(f+g) is comprised between 0.1 and 10, f/g is comprised between 2 and 10, $$—O(CF_2CF(CF_3)O)_e(CF_2CF_2O)_f(CFXO)_g— \qquad (c')$$

wherein
X is F or $CF_3$; e, f, g are such numbers that the molecular weight is comprised in the range indicated above; e/(f+g) is comprised between 0.1 and 10, f/g is comprised between 2 and 10, $$T—O(CF_2O)_j(CF_2CF(OR_{f'})O)_k(CF(OR_{f'})O)_l— \qquad (d)$$

wherein $R_{f'}$ is $—CF_3$, $—C_2F_5$, $—C_3F_7$; j,k,l are such numbers that the molecular weight is comprised in the range indicated above; k+l and j+k+l are at least equal to 2, k/(j+l) is comprised between 0.01 and 1000, l/j is comprised between 0.01 and 100;

$$T—O(CF_2(CF_2)_zCF_2O)_s— \qquad (e)$$

wherein s an integer such as to give the molecular weight indicated above, z has the meaning already defined;

$$—O(CF_2(CF_2)_zCF_2O)_s— \qquad (e')$$

wherein s is an integer such as to give the molecular weight indicated above, z has the meaning already defined.

$$T—O(CR_4R_5CF_2CF_2O)_{j''}— \qquad (f)$$

wherein $R_4$ and $R_5$ are equal to or different from each other and chosen between H, Cl or perfluoroalkyl, for instance with 1–4 carbon atoms, j' being an integer such that the molecular weight is that indicated above; said unit inside the fluoropolyoxy-alkylenic chain being linked each other as follows to have a bivalent radical:

$$—(OCR_4R_5CF_2CF_2)_{p'}—O—R'_f—O—(CR_4R_5CF_2CF_2O)_{q'}—$$

wherein $R'_f$ is a fluoroalkylenic group, for instance with 1 to 4 carbon atoms, p' and q' are integers from 0 to 200, and p'+q' is at least 1 and such that the molecular weight is that indicated above;

$$T—O(CF(CF_3)CF_2O)_{j''}— \qquad (g)$$

j" being an integer such as to give the molecular weight indicated above; said units being linked each other inside the fluoropolyoxyalkylenic chain as follows to have a bivalent radical:

$$—(OCF_2CF(CF_3))_{a'}O—CF_2(R'_f)_xCF_2—O—(CF(CF_3)CF_2O)_{b'}—$$

wherein $R'_f$ has the meaning indicated above, x is 0 or 1, a' and b' are integers and a'+b' is at least 1 and such that the molecular weight is that indicated above.

These compounds and the methods for preparing them are described in the patents GB 1,104,482, U.S. Pat. Nos. 3,242,218, 3,665,041, 3,715,378 and 3,665,041, EP 148,482 and U.S. Pat. Nos. 4,523,039, 5,144,092.

The preferred perfluoropolyether radicals of the present invention have the following chemical structure:

$$TO(CF_2CF(CF_3)O)_{n''}(CF_2O)_{m'}$$

wherein the n"/m' ratio ranges from about 20 to about 40, T as above defined.

The surfactant amount of the present invention in general ranges between 0.01–10 g/kg reaction medium, preferably between 0.1–3 g/kg.

The process of the present invention is generally carried out at a temperature comprised between −30° and +150° C., preferably between −10° and +80° C., the reaction pressure is comprised within wide limits, generally between 1 and 100 bar, preferably between 10 and 40 bar.

The reaction medium consists of an organic phase, to which water is usually added in order to favour the heat dispersion occurring during the reaction. The preferred reaction medium comprises water, generally the water % by weight is 10–90 with respect to total weight of the medium comprising the monomers. The organic phase can be formed by the monomers themselves, without addition of solvents, or by the monomers dissolved in a suitable organic solvent. As organic solvents, chlorofluorocarbons are commonly employed, such as $CCl_2F_2$(CFC-12), $CCl_3F$(CFC-11), $CCl_2FCClF_2$(CFC-113), $CClF_2CClF_2$(CFC-114), etc. Since such products have a destroying effect on the ozone present in the stratosphere, alternative products are available, such as the compounds containing carbon and fluorine, optionally containing hydrogen to obtain the well known hydrofluorocarbons (HFC). Hydrofluorocarbons can optionally contain also chlorine atoms (HCFC). The above indicated solvents can optionally contain oxygen. See for instance U.S. Pat. No. 5,182,342.

A valid alternative consists in branched chain hydrocarbons, described in U.S. Pat. No. 5,434,229, having from 6 to 25 carbon atoms and a ratio between methyl groups and number of carbon atoms higher than 0.5, such as for instance 2,3-dimethylbutane, 2,3-dimethylpentane, 2,2,4-trimethylpentane, 2,2,4,6,6-pentamethylheptane, 2,2,4,4,6-pentamethylheptane, etc, or mixtures thereof.

In order to check the molecular weight of the final product, suitable chain transfer agents can be added to the reaction system, such as: ketones, esters, ethers or aliphatic alcohols having from 3 to 10 carbon atoms; hydrocarbons or halogenated hydrocarbons, having from 1 to 6 carbon atoms; bis-(alkyl)carbonates wherein the alkyl has from 1 to 5 carbon atoms; etc. Among them, chloroform, methylcyclopentane and $CHCl_2CF_3$ (123) are particularly preferred.

The use of methylcyclopentane, and more generally of alkylsubsituted cyclopentanes with one or more $C_1$–$C_6$ alkyls, as chain transfer agents in processes for preparing at low temperature fluorinated (co)polymers containing hydrogen is described in EP patent 673,952. The transfer agent is sent to the reactor at the beginning of the reaction, or in a continuous way or in discrete amounts during the polymerization.

The amount of chain transfer agent used can range within rather wide limits, depending on the type of monomers employed, on the reaction temperature and on the molecular weight meant to be obtained. Generally, such amount ranges between 0.01 and 30% by weight, preferably between 0.05 and 10% by weight, with respect to the total amount of monomers introduced in the reactor.

As radical initiators of the polymerization processes of the present invention can be chosen those well known in the art, for instance:
bisacylperoxides of formula $(Rf''' COO)_2$ wherein $Rf'''$ is a (per)haloalkyl $C_1$–$C_{10}$, see for instance EP 185,242, EP 673,951 and U.S. Pat. No. 4,513,129, or a perfluoropolyether group, see for instance EP 186,215 and U.S. Pat. No. 5,021,516.
In this class we can mention: bis-dichlorofluoroacetylperoxide (DCFAP), bis-trichloroacetylperoxide (TCAP);
dialkylperoxydicarbonates with the alkyl from 1 to 8 carbon atoms, see for instance EP 526,216. Di-n- propyl-peroxydicarbonate and di-isopropyl-peroxydicarbonate can be mentioned;

dialkyls or diarylperoxides. Di-terbutylperoxide, dibenzoylperoxide can for instance be mentioned.

The amount of initiator generally ranges between 0.05 and 10% by weight, preferably between 0.05 and 2% by weight.

By thermoplastic fluoropolymers containing hydrogen are meant all those polymers having thermoplastic properties obtainable by homopolymerization of an hydrogenated fluoroolefin or copolymerization of the latter with a (per) fluorinated monomer, or by copolymerization of a per(halo) fluoroolefin with a completely hydrogenated olefin. One or more fluorinated comonomers can also be present as modifiers, in amounts comprised between 0.1 and 10% by moles, for instance those indicated in points (1) and (2) hereinafter.

In particular, the process object of the present invention can advantageously be employed for:

(1) the copolymers between a per(halo)fluoroolefin $C_2$—$C_8$, for instance TFE or chlorotrifluoroethylene (CTFE), and a completely hydrogenated olefin $C_2$—$C_8$ such as for instance ethylene, propylene or isobutylene, with a molar ratio between completely hydrogenated olefin and per (halo) fluoroolefin comprised between 40:60 and 60:40, optionally containing small amounts, generally comprised between 0.1 and 10% by moles, of one or more fluorinated comonomers, selected, for instance among the compounds of formula $CX_2=CFR_{f0}$, wherein X is H or F, $R_{f0}$ is a fluoroalkyl $C_2$—$C_{10}$, optionally containing one or more ether groups, for instance methyl-, ethyl-,propyl-vinylether, see for instance U.S. Pat. Nos. 4,513,129, 3,624,250), or among perfluorodioxoles (see for instance U.S. Pat. Nos. 3,865,845, 3,978,030, EP-73,087, EP-76, 581, EP-80,187);

(2) polivinylidenfluoride or polivinylfluoride, optionally modified with small amounts, generally comprised between 0.1 and 10% by moles, of one or more fluorinated comonomers, such as vinylfluoride, chlorotrifluoroethylene, hexafluoropropene, tetrafluoroethylene, trifluoroethylene, etc. (see U.S. Pat. Nos. 4,524,194 and 4,739,024).

The following examples are given for illustrative purposes but are not limitative of the present invention.

EXAMPLE 1

Comparative

In an enameled autoclave having a volume of 18 l equipped with baffles and stirrer working at 450 rpm in Hastelloy C, 4.3 l of demineralized water, 1.7 l (1.36 kg) of methanol, 21 ml of chloroform, 480 g of perfluoropropylvinylether and 3 kg of chlorotrifluoroethylene were introduced. The temperature was maintained at 5° C. Then ethylene was introduced up to a pressure of 11.35 absolute bar. In the autoclave the radical initiator was then gradually introduced, under the form of a solution, maintained at −17° C., of trichloroacetylperoxide (TCAP) in isooctane having the titre reported in the Table.

The pressure was maintained constant for the whole polymerization by continuously feeding ethylene in the reactor up to a consumption of 300 g. The other reaction parameters and the Melt Flow Index (MFI) according to ASTM 3275-89 standard of the obtained polymer are reported in the Table. The polymer has a second melting temperature (determined by differential scanning calorimetry, DSC) of 234° C.

EXAMPLE 2

Comparative

Example 1 was repeated except that 1.7 l of demineralized water were introduced instead of methanol.

EXAMPLE 3

Comparative

Example 1 was repeated except that 1.7 l of demineralized water and 6 g of the following surfactant were introduced instead of methanol:

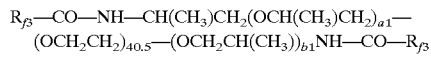

wherein a1+b1 is equal to 2.5, $R_{f3}$ is $R_{f2}O(CF_2-CF(CF_3)O)_{n''}(CF(CF_3)O)_{p'}(CF_2O)_{m'}CF_2$ $R_{f3}$ having a molecular weight of about 650.

$R_{f2}$ is a perfluoroalkyl having from 1 to 3 carbon atoms.

The surface tension values (dine/cm) in water according to the ASTM D1331-89 standard of the surfactant indicated above at 25° C. are 35.5 (at the concentration of 0.01 g/l) and 25 (at the concentration of 1 g/l).

The results are reported in the Table.

EXAMPLE 4

Comparative

Example 1 was repeated except that 1,7 l of demineralized water and 6 g of the following surfactant were introduced instead of the methanol:

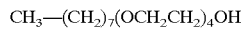

The results are reported in the Table.

EXAMPLE 5

Example 1 was repeated except that 1,7 l of demineralized water and 6 g of the following surfactants were introduced instead of methanol:

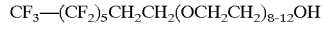

The results are reported in the Table.

EXAMPLE 6

Example 1 was repeated except that 1,7 l of demineralized water and 6 g of the following surfactants were introduced instead of methanol:

wherein $R_3$ is H, $CH_3$ with a ratio between $H/CH_3=19/3$;

$R_{f3}$ is $R_{f2}O(CF_2-CF(CF_3)O)_n(CF(CF_3)O)_m(CF_2O)_pCF_2$ $R_{f3}$ having a molecular weight of about 650.

$R_{f2}$ is a perfluoroalkyl $C_1$–$C_3$.

The surface tension values (dine/cm) in water according to the ASTM D1331-89 standard of the surfactant indicated above at 25° C. are 35 (at the concentration of 0.01 g/l) and 25 (at the concentration of 1 g/l).

The results are reported in the Table.

TABLE

|  | EXAMPLE 1 (comp) | EXAMPLE 2 (comp) * | EXAMPLE 3 (comp) | EXAMPLE 4 (comp) | EXAMPLE 5 | EXAMPLE 6 |
|---|---|---|---|---|---|---|
| Reaction time, min. | 435 |  | 405 | 320 | 315 | 285 |
| Rp ( g polymer/min) | 5.6 |  | 6.0 | 7.4 | 7.7 | 8.4 |
| Tot. TCAP sol., ml | 202 |  | 174.5 | 132 | 137.5 | 89 |
| Titre TCAP sol., (g TCAP/ml) | 0.104 |  | 0.118 | 0.126 | 0.096 | 0.126 |
| TCAP (total), g | 21.0 |  | 20.6 | 16.7 | 13.2 | 11.2 |
| Polymerization yield: Rp/TCAP (g polymer/min g TCAP) | 0.27 |  | 0.29 | 0.44 | 0.58 | 0.75 |
| buildup % | 2.2 | 26 | 2.4 | 5.7 | 4.1 | 2.9 |
| Distr. particles size |  |  |  |  |  |  |
| >0.42 mm ASTM #40, % | 89.3 | 74.4 | 98.6 | 95.8 | 96.9 | 97.2 |
| 0.21 + 0.42 mm ASTM #70, % | 5.1 | 5.0 | 1.1 | 2.4 | 0.6 | 0.8 |
| Fines (<0.21 mm ASTRM #70), % | 5.6 | 20.6 | 0.3 | 1.8 | 2.5 | 2.0 |
| MFI (g/10') | 12.3 |  | 6.9 | 11.5 | 11.2 | 8 |
| Thermal stability at 300° C. |  |  |  |  |  |  |
| 1° change, s | 300 |  |  | 0 | 600 | 600 |
| 2° change, s | 600 |  | 0 | 300 | 1200 | 1200 |

1° Change: beginning degradation and/or beginning discoloration
2° Change: total degradation
*Polymerizatiohn with "runaway"

What is claimed is:

1. A surfactant having the formula:

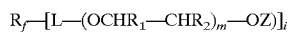

$R_f$—[L—(OCHR$_1$—CHR$_2$)$_m$—OZ)]$_i$ wherein i is equal to 1 or 2;

m is an integer between 4 and 60;

L is selected from the group consisting of —(CFY—CO—O)$_p$R' and —(CFY—CO—NH)$_p$R'—, wherein p is an integer equal to 0 or 1;

Y=F, or CF$_3$; R' is a linear or branched $C_1$ to $C_5$ alkyl radical;

$R_1$ and $R_2$ can both be H or the former can be H and the latter CH$_3$;

Z can be H, or a linear or branched $C_1$ to $C_3$ alkyl radical or (CH$_2$)$_n$OH where n is an integer from 1 to 6, excluding L=—(CFY—CO—O)$_p$R'— when i=1; and $R_f$ is a perfluoroalkyl radical or a perfluoropolyether radical, having an average number molecular weight between 250 and 1500.

2. The surfactant according to claim 1 wherein $R_f$ is a perfluoropolyether radical.

3. The surfactant according to claim 1 wherein i is 1.

4. The surfactant according to claim 1 wherein m is an integer between 8 and 30.

* * * * *